United States Patent [19]

Drake et al.

[11] 4,451,608

[45] May 29, 1984

[54] AMPHOTERIC ACRYLIC ESTER BASED LATEXES

[75] Inventors: Kenneth Drake; Richard A. Hammock, both of Charleston, W. Va.

[73] Assignee: Union Carbide Corporation, Danbury, Conn.

[21] Appl. No.: 393,546

[22] Filed: Jun. 30, 1982

[51] Int. Cl.$^3$ .............................................. C08L 33/06
[52] U.S. Cl. .................................................... 524/560
[58] Field of Search ......................................... 524/560

[56] References Cited

U.S. PATENT DOCUMENTS

| | | | |
|---|---|---|---|
| 3,325,443 | 6/1967 | Christenson et al. | 524/560 |
| 3,455,727 | 7/1969 | Dye | 524/560 |
| 3,894,980 | 7/1975 | De Tommaso | 117/68.5 |
| 4,062,823 | 12/1977 | Cheung et al. | 260/856 |
| 4,221,885 | 9/1980 | Schimmel et al. | 524/560 |

FOREIGN PATENT DOCUMENTS 1123303 8/1968 United Kingdom .

*Primary Examiner*—Joseph L. Schofer
*Assistant Examiner*—N. Sarofim
*Attorney, Agent, or Firm*—Bernard Francis Crowe

[57] ABSTRACT

Amphoteric acrylic-based latexes are produced by the imination of from about 25% to about 75% of the carboxylic sites of base polymers latexes having an acrylic acid and/or methacrylic acid content of from about 10 to about 35 weight percent, based on the total weight of monomers employed in such base polymers.

10 Claims, No Drawings

AMPHOTERIC ACRYLIC ESTER BASED LATEXES

BACKGROUND OF THE INVENTION

Acid-soluble and base-soluble acrylic ester based latexes are well known in the art. For example, the *Encyclopedia of Polymer Science and Technology*, Vol. 8 pg. 187, Interscience—Wiley (1968) states that "acrylic polymers have been produced (for use as floor polishes) which can be removed only by acids, e.g., vinegar, or are complexed with metal and thus can be removed only by alkali, e.g., ammonia. These materials are more soap resistant than ordinary polishes and can resist washing; these properties permit easier maintenance." Similarly, U.S. Pat. No. 3,894,980 discloses the use of base-soluble alkoxyalkyl acrylic-based polymers, having a relatively high acrylic or methacrylic acid content (of from about 15 to 40 percent), as thickeners in aqueous systems, while U.S. Pat. No. 4,062,823 discloses the use of a basic (i.e., amine-containing) acrylic latex as an additive in water-based paints.

Thus, it would be advantageous to have an acrylic-based latex which is soluble in either acids or bases for use in floor polishes, paints, etc. It has now been unexpectedly found that acrylic-based latexes may be prepared which are soluble in either aqueous acid or base, but remain as stable latexes at a neutral pH.

SUMMARY OF THE INVENTION

This invention relates to novel amphoteric acrylic-based latexes which are soluble in acidic or basic aqueous solutions, but which form stable latexes at a neutral pH.

In another aspect, this invention relates to a process for the preparation of these amphoteric latexes. In general, the amphoteric latexes which are the subject of this invention are prepared by the partial imination of an acrylic base polymer latex having a high acrylic acid and/or methacrylic acid content. This imination is accomplished by reacting such acrylic base polymer latex with a specified amount of an alkylene imine.

DESCRIPTION OF THE INVENTION

The amphoteric latexes of this invention are, in general, polymers of acrylic esters having an acrylic acid and/or methacrylic acid content of from about 10 to about 35 weight percent, preferably from about 15 to about 25 weight percent, based on the total weight of monomers employed, which have been partially iminated by reaction with a specified amount of an alkylene imine. The polymers produced by this partial imination retain enough unreacted carboxylic sites so as to preserve their base-solubility, yet at the same time possess enough aminoester sites such that the polymer is acid-soluble as well. Moreover, these polymers form stable latexes at a neutral pH.

The base polymer latexes which are iminated to form the amphoteric latexes of the instant invention are made up of at least about 45 weight percent water, and up to about 55 weight percent solids, which are polymers comprised of:

(a) from about 65 to about 95 weight percent, preferably from about 75 to about 85 weight percent of methacrylic esters and/or acrylic esters;

(b) from about 10 to about 35 weight percent, preferably from about 15 to about 25 weight percent of methacrylic acid and/or acrylic acid; and (c) from 0 to about 25 weight percent of other pH neutral monomers capable of polymerizing with acrylic esters and/or methacrylic esters; and (d) from about 0.5 to about 2 weight percent, preferably about 1 weight percent of a chain transfer agent.

Wherein the amounts of components (a) through (d) are based on the total weight of monomers in the base polymer (The expression "monomers in the base polymer" refers to components (a), (b) and (c) listed above.)

These base polymers are produced as latexes by emulsion polymerization processes using known catalysts and chain transfer agents. In addition to those components listed above, the polymerizable feed compositions can also contain, as is known to one skilled in this art, any of the other known additives conventionally used in emulsion polymerization processes in the usual known quantities, such as crosslinkers, dispersion aids, surfactants, emulsifiers, bacteriocides, fungicides, etc.

The acrylic esters and/or methacrylic esters which may be employed may be represented by the formula:

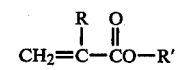

wherein R is aryl or hydrogen or methyl and R' is alkyl of from 1 to 12 carbon atoms, preferably 1 to 8 carbon atoms.

Illustrative of such esters are alkyl esters such as methyl acrylate, methyl methacrylate, ethyl acrylate, ethyl methacrylate, n-propyl acrylate, n-propyl methacrylate, 2-ethylhexyl acrylate, 2-ethylhexyl methacrylate, n-butyl acrylate, isobutyl acrylate, n-butyl methacrylate, t-butyl acrylate, and the like; and aryl acrylates such as benzyl acrylate, benzyl methacrylate, tolyl acrylate, tolyl methacrylate, naphthyl acrylate, and the like. Further, mixtures of the above may be employed.

In addition, the base polymer may contain from 0 to about 25 weight percent, based upon the total weight of monomers employed, of monomers which are capable of polymerizing with acrylates and which are pH neutral. Illustrative of such monomers are unsaturated hydrocarbons such as styrene, ethylene, propylene, isopropylene, and the like.

However, these monomers should not contain more than 12 carbon atoms because, due to the hydrophobic nature of such hydrocarbons, the iminated latex will be correspondingly more difficult to solubilize in an aqueous medium.

In carrying out the emulsion polymerization of the base polymer latex of this invention an initiator or catalyst is used at a concentration sufficient to catalyze the polymerization reaction. The particular concentration used in any instance will depend upon the specific monomer mixture undergoing reaction and the specific initiator or catalyst employed. These facts are known to those skilled in the art; however, in general, from about 0.1 to about 1.0 weight percent of catalyst or initiator will be employed, based on the total weight of monomers charged. Illustrative of suitable initiators, one can mention hydrogen peroxide, peracetic acid, t-butyl hydroperoxide, di-t-butyl hydroperoxide, dibenzoyl peroxide, benzoyl hydroperoxide, 2,4-dichlorobenzoyl peroxide, 2,5-dimethyl-2,5-bis(hydroperoxy)hexane, perbenzoic acid, t-butyl peroxypivalate, t-butylperacetate, dilauroyl peroxide, dicapryloyl peroxide, distearoyl peroxide, dibenzoyl peroxide, diisopropyl peroxydicarbonate, didecyl peroxydicarbonate, dieicosyl peroxydicarbonate, di-t-butyl perbenzoate, 2,2'-azobis-2,4-dimethylvaleronitrile, ammonium persulfate, potassium persulfate, sodium persulfate, sodium perphosphate, azobis(isobutyronitrile), and the like. As will be known to one skilled in the art several of these initiators will require the use of reducing agents, such as, for example, sodium sulfite, sodium bisulfite, sodium formaldehyde sulfoxylate, sodium metabisulfite, ascorbic acid, and the like. It is also known that traces of metal ions, such as iron, can be added as activators to improve the rate of polymerization, if desired.

In addition, in order to enhance solubility, a chain transfer agent should be present during the polymerization reaction at a concentration of from about 0.5 to about 2 weight percent, preferably about 1 weight percent, based on the weight of monomers charged. Illustrative of the chain transfer agents which may be employed are alkyl and aryl mercaptans such as, for example, butyl mercaptan, mercaptoacetic acid, mercaptoethanol, 3-mercapto-1,2-propanediol, 2-methyl-2-propanethiol, t-dodecyl mercaptan, phenyl mercaptan, pentaerythritol tetramercaptopropionate, octadecyl mercaptan, tetradecyl mercaptan, and the like.

Preferably a surfactant is also employed in the reaction mixture. In general, any of the surfactants commonly employed in emulsion polymerization processes can be used. Illustrative of suitable surfactants are anionic surfactants such as potassium caprylate, potassium myristate, potassium palmitate, potassium stearate, potassium oleate, sodium decyl sulfonate, sodium dodecyl sulfonate, sodium tetradecyl sulfate, sodium decyl sulfate, sodium lauryl sulfate, potassium dehydroabietate, sodium rosinate, alkyl sodium sulfosuccinate esters, and the like; cationic surfactants such as the long chain quaternary amine salts; and nonionic surfactants such as ethylene oxide condensates of oleyl alcohol, cetyl alcohol, lauryl alcohol etc., ethylene oxide condensates of linoleic acid, lauric acid, ricinoleic acid, caproic acid, etc., block copolymers of ethylene oxide and propylene oxide, and the ethylene oxide condensates of octyl phenol or nonyl phenol and the like.

In the process of this invention, latex initiation is performed in accordance with the procedures known in the art. The aqueous reaction medium is charged to the reaction zone and the monomers to be polymerized are thereafter fed continuously to the aqueous medium in the reaction zone together with a catalyst and, if desired, surfactant, buffer, etc. By the term "aqueous reaction medium" is meant water plus any other constituents, e.g. catalyst, surfactant, buffer, etc., which are present in the reaction zone in which the polymerization of this process is carried out. The temperature of initiation varies depending, inter alia, on the type of monomers used, the amount and type of catalyst used, etc. Those skilled in the art will know the correct initiation temperature for any given system. Typically, for the acrylic-based ester/methacrylic or acrylic acid monomer combinations employed in the instant invention, temperatures of from about 65° C. to about 95° C. are preferred. Preferably, the reaction is carried out at atmospheric pressure, although higher or lower pressures may also be employed. Reaction time is not critical, and may vary from less than several hours to several days or more depending upon the specific reactants, reaction batch size, temperature, pressure, etc. selected.

The skilled worker in the art will recognize that the number of polymer particles in the base polymer latex—which in turn is determinative of final polymer particle size—is substantially determined during the initiation step, and further, that it is affected by the amount of surfactant present during initiation. Thus the size of the particles may be controlled by means well known to one skilled in the art. The preferred particle size will vary with the use to which the final latex is to be applied.

Once the base polymer has been formed, it is partially iminated while still in the latex form by the addition of an alkylene imine. This partial imination may be represented as diagrammed below by the reaction of the free carboxyl group with the imine.

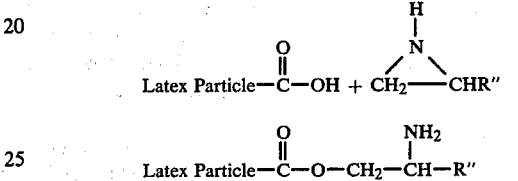

wherein R" is hydrogen, or linear or branched alkyl of from 1 to 5 carbon atoms.

The alkylene imines which may be employed are shown by the above formula. The preferred alkylene imines are ethylene imine and propylene imine, wherein R" equals H or $CH_3$ The amount of alkylene imine charged should be sufficient to iminate from about 25% to about 75%, preferably from about 40% to about 60%, most preferably about 50% of the carboxylic groups on the base polymer. Thus, the ratio of moles of alkylene imine to moles of acrylic and/or methacrylic acid may vary from about 0.25:1 to about 0.75:1, is preferably from about 0.4:1 to about 0.6:1, and is most preferably about 0.5:1.

The imination reaction is conducted at temperatures of from about 15° C. to about 90° C., preferably from about 25° C. to about 50° C. The reaction is preferably carried out at atmospheric pressure, although higher pressures may be utilized. Subatmospheric pressures are disfavored due to the toxicity of the alkylene imines which are employed. Reaction time is not critical and may vary from less than several hours to several days or more depending upon the reactants, reaction batch size, temperature, pressure, etc. selected.

The polymers produced by this partial imination were surprisingly and unexpectantly found to be both acid- and base-soluble, in addition to being stable latexes at neutral pH. These latexes may be formed with a solid content of up to about 55 weight percent, preferably of up to about 40 weight percent.

EXAMPLES

The following examples serve to further illustrate this invention. They are not intended to limit the scope of this invention in any way.

Several amphoteric acrylic-based latexes were produced in the following manner. To a 3-liter reactor, equipped with a stirrer and four stainless steel baffles, were charged 2.1 dry grams of sodium dioctyl sulfylsuccinate (Aerosol OT-75 TM, American Cyanamid)

(added as a 75% solution), and 848 grams of water. This initial charge was heated to 80° C. and 4 grams of ammonium persulfate was added. The mixture was stirred for 5 minutes and two feeds into the reactor were begun. The first of these feeds was comprised of 800 grams of the acrylic ester monomers and methacrylic acid, plus butyl mercaptan in the amounts indicated in Table I below. This monomer feed was fed below the surface and continued for 2.5 hours. The second feed contained 6.0 dry grams of the sodium salt of the half-ester of maleic acid and a sulfonated ethoxylated nonylphenol (Polystep RA—35S ™, Stepan) (added as a 35% solution) and 133 grams of water. This second feed was fed above the surface of the reaction mixture and continued during the 2.5 hour period. The reaction was maintained at about 80° C. during the feed period and for one hour thereafter; it was then cooled quickly. The resulting base polymer latex had a theoretical total solids content of 45% by weight.

These base polymer latexes were stored at room temperature for 13–14 days, and then diluted with water so that their solids content was 20% by weight. They were then partially iminated by the addition of 50 mole percent of propyleneimine (added as a 20% solution by weight in water), based on the methacrylic acid content of the polymer involved.

The latexes were titrated with sodium hydroxide and hydrochloric acid to determine the pH of their base and acid solubilities respectively. The results are summarized in Table I below. The term "pH of solubility" in Table I refers to the pH at which the latex solution became clear, i.e., the pH at which the partially iminated polymers became soluble in the acidic or basic aqueous solution.

In Table I below, the below listed compounds have been abbreviated as follows:
ethyl acrylate: EA
n-butyl acrylate: BA
methyl methacrylate: MMA
methacrylic acid: MAA
propyleneimine: PI
butyl mercaptan: BuSH (a) from about 65 to about 90 weight percent of acrylic esters and/or methacrylic esters of the formula:

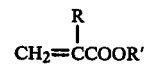

wherein R is hydrogen or methyl and R' is aryl or alkyl of from 1 to 12 carbon atoms;
(b) from about 10 to about 35 weight percent acrylic acid and/or methacrylic acid;
(c) from 0 to about 25 weight percent of pH neutral monomers capable of polymerizing with acrylic esters and/or methacrylic esters; and
(d) from about 0.5 to about 2 weight percent of a chain transfer agent, wherein the weight percents of components (a), (b), (c) and (d) are based upon the total weight of monomers in the base polymer; and (II) at least about 45 weight percent water; with from about 25 to about 75 mole percent, based on the number of moles of acrylic acid and/or methacrylic acid in the base polymer, of an alkylene imine of the formula:

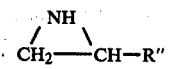

wherein R" is hydrogen or linear or branched alkyl of from 1 to 5 carbon atoms.

2. The latex of claim 1 wherein the base polymer latex comprises up to about 45 weight percent solids.

3. The latex of claim 1 wherein from about 75 to about 85 weight percent, of acrylic esters and/or methacrylic esters are employed, based on the total weight of monomers in the base polymer.

4. The latex of claim 1 wherein from about 15 to 25 weight percent of methacrylic acid and/or acrylic acid is employed, based on the total weight of monomers in the base polymer.

5. The latex of claim 1 wherein about 1 weight per-

TABLE I

| Example | EA wt %** | EA grams | BA wt % | BA grams | MMA wt % | MMA grams | MAA wt % | MAA grams | BuSH wt % | BuSH grams | PI wt % | pH of solubility* in acid | pH of solubility* in base |
|---|---|---|---|---|---|---|---|---|---|---|---|---|---|
| 1 | 45 | 360 | — | — | 30 | 240 | 25 | 200 | 1.0 | 8.0 | 8.3 | 3.4 | 8.6 |
| 2 | 50 | 400 | — | — | 35 | 280 | 15 | 120 | 1.0 | 8.0 | 5.0 | 2.0 | 9.5 |
| 3 | — | — | 45 | 360 | 30 | 240 | 25 | 200 | 1.0 | 8.0 | 8.3 | 2.4 | 9.2 |
| 4 | 23.75 | 190 | 23.75 | 190 | 32.5 | 260 | 20 | 160 | 0.5 | 4.0 | 6.6 | 1.9 | 9.5 |

*defined as pH at which latex solution turned clear.
**weight percents of EA, BA, MMA, BuSH, and PI all based upon total weight of monomers charged.

The data in Table I clearly demonstrates the surprising amphoteric character of these novel latexes. Examination of the last column, "pH of solubility", shows that the latexes of the instant invention are soluble in either acidic or basic solutions. This property, coupled with their stability as latexes at neutral pH was completely unexpected. This amphoteric character enhances the use of these latexes in floor polishes, or as thickeners, flocculents and the like.

We claim:
1. An aqueous amphoteric latex formed by reacting a base polymer latex containing
(I) up to about 55 weight percent solids comprised of:

cent of a chain transfer agent is employed, based on the total weight of monomers in the base polymer.

6. The latex of claim 1 wherein the alkylene imine is one of ethylene imine and propylene imine.

7. The latex of claim 1 wherein the alkylene imine is present in an amount of from about 40 to about 60 mole percent based on the number of moles of acrylic acid and/or methacrylic acid employed.

8. The latex of claim 1 wherein the alkylene amine is present in an amount of about 50 mole percent, based on the number of moles of acrylic acid and/or methacrylic acid employed.

9. An aqueous amphoteric latex formed by reacting a base polymer latex containing (I) up to about 55 weight percent solids comprised of:
  (a) from about 75 to about 85 weight percent of acrylic esters and/or methacrylic esters of the formula:

$$CH_2=\overset{R}{\underset{|}{C}}COOR'$$

wherein R is hydrogen or methyl and R' is alkyl of from 1 to 8 carbon atoms,
  (b) from about 15 to about 25 weight percent acrylic acid and/or methacrylic acid,
  (c) from 0 to about 25 weight percent of pH neutral monomers capable of polymerizing with acrylic esters and/or methacrylic esters; and
  (d) about 1 weight percent of a chain transfer agent, wherein the weight percents of components (a), (b), (c) and (d) above are based upon the total weight of monomers in the base polymer; and
(II) at least 45 weight percent water; with about 50 mole percent of ethylene imine or propylene imine, based on the number of moles of acrylic acid and/or methacrylic acid employed.

10. A process for the production of aqueous amphoteric latexes comprising reacting a base polymer latex comprising
(I) up to about 55 weight percent solids comprised of:
  (a) from about 65 to about 90 weight percent of acrylic esters and/or methacrylic esters of the formula:

$$CH_2=\overset{R}{\underset{|}{C}}COOR'$$

wherein R is hydrogen or methyl and R' is aryl or alkyl of from 1 to 12 carbon atoms;
  (b) from about 10 to about 35 weight percent acrylic acid and/or methacrylic acid;
  (c) from 0 to about 25 weight percent of pH neutral monomers capable of polymerizing with acrylic esters and/or methacrylic esters; and
  (d) from about 0.5 to about 2 weight percent of a chain transfer agent, wherein the weight percents of components (a), (b), (c) and (d) are based upon the total weight of monomers in the base polymer; and
(II) at least about 45 weight percent water; with from about 25 to about 75 mole percent, based on the number of moles of acrylic acid and/or methacrylic acid in the base polymer, of an alkylene imine of the formula:

$$\underset{CH_2\text{———}CH-R''}{\overset{NH}{\diagup \quad \diagdown}}$$

wherein R'' is hydrogen or linear or branched alkyl of from 1 to 5 carbon atoms.

* * * * *